US006939432B2

(12) United States Patent
Chao et al.

(10) Patent No.: US 6,939,432 B2
(45) Date of Patent: Sep. 6, 2005

(54) AQUEOUS VACUUM FORMING LAMINATING ADHESIVE COMPOSITION, SUBSTRATES AND METHODS RELATED THERETO

(75) Inventors: Tien-Chieh Chao, Mars, PA (US); Umesh C. Desai, Wexford, PA (US); Charles M. Kania, Natrona Heights, PA (US); Masayuki Nakajima, Wexford, PA (US); Kaliappa G. Ragunathan, Gibsonia, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 205 days.

(21) Appl. No.: 10/226,895

(22) Filed: Aug. 23, 2002

(65) Prior Publication Data

US 2004/0038041 A1 Feb. 26, 2004

(51) Int. Cl.[7] .............................. C08L 9/10; C08L 11/02
(52) U.S. Cl. ................ 156/333; 156/330.9; 156/331.3; 156/331.4; 156/331.7; 525/144; 428/411.1
(58) Field of Search ................... 156/330.9, 331.3, 156/331.4, 331.7, 331.8, 333; 525/144; 428/411.1

(56) References Cited

U.S. PATENT DOCUMENTS 4,463,110 A * 7/1984 Perlinski et al. ............ 523/409
5,385,979 A * 1/1995 Ozawa et al. ............... 525/145
5,430,094 A * 7/1995 Gola et al. .................. 524/507
5,652,298 A * 7/1997 Murray ....................... 524/571
6,310,125 B1 10/2001 Rayner ....................... 524/195

FOREIGN PATENT DOCUMENTS

JP    62096576 A * 5/1987 .............. C09J/3/12
JP    02127491 A * 5/1990 .......... C09J/175/04

OTHER PUBLICATIONS

3M's hard-to-bond solution, Automotive Engineering International Online: Material Innovations, http://www.sae.org/automag/material/03-200/index.htm.

* cited by examiner

*Primary Examiner*—Sam Chuan Yao
(74) *Attorney, Agent, or Firm*—Deborah M. Altman

(57) ABSTRACT

The present invention provides an aqueous adhesive composition including a resinous phase dispersed in an aqueous medium, the resinous phase containing (a) a polychloroprene, (b) optionally, a halogenated polyolefin different from (a), and (c) optionally, an aminoplast resin. Further provided is an aqueous adhesive composition of a resinous phase dispersed in an aqueous medium wherein the resinous phase includes (a) a polychloroprene, (b) a halogenated polyolefin different from (a), and (c) a polyurethane polymer having ionic salt groups. A multi-layer composite and methods for adhering a thermoplastic material to a rigid substrate using the aqueous adhesive compositions also are provided.

24 Claims, No Drawings

AQUEOUS VACUUM FORMING LAMINATING ADHESIVE COMPOSITION, SUBSTRATES AND METHODS RELATED THERETO

FIELD OF THE INVENTION

The present invention relates to an aqueous vacuum-forming laminating adhesive composition. The adhesive composition is particularly useful for lamination of thermoplastic materials to rigid substrates having low surface energy which typically are used in the automotive industry.

BACKGROUND OF THE INVENTION

Vacuum forming is a well known process, particularly in the automotive industry. For example, a thermoplastic material (e.g., polyvinyl and polyurethane flexible sheeting) can be laminated onto automobile components such as consoles, instrument panels, arm rests, door panels and other interior surfaces using vacuum forming. The thermoplastic material has an outer side, which typically provides color and texture to the resulting laminated substrate, and an underside which can further include a primer layer for enhanced adhesion to the substrate. Common substrates typically include a variety of known materials, such as acrylonitrile-butadiene-styrene terpolymer (ABS) or fiberboard. The process typically includes coating the substrate with a laminating adhesive, heating the thermoplastic material past its softening point, and draping the thermoplastic material onto the substrate. A vacuum is then applied through the substrate to pull the thermoplastic material onto the contours of the substrate, thereby forming a conformal layer of the thermoplastic material over at least a portion of the substrate.

Use of organic solvent-based adhesives in vacuum forming is common in the industry. However, emission of organic solvents to the atmosphere can be a concern, and reduction of the volatile organic content of adhesive compositions is very desirable to comply with government regulations. Such adhesives also can present work hazards typically associated with organic solvents. Many of the known adhesive compositions are provided in the form of a two-pack system. Exemplary of such two-pack solvent-based compositions are those known in the art in which one pack is based on an aqueous aromatic polyurethane emulsion or dispersion, and another pack is based on a water-dispersible crosslinking agent such as an unblocked isocyanate. The two packs must be stored separately and mixed only just prior to application. Once admixed, such compositions are stable for only several hours, and within several hours recognizable performance decreases are observed.

In view of the foregoing discussion, single package water-based vacuum-forming laminating adhesive compositions can provide obvious advantages over the two-package solvent-based compositions. Such aqueous adhesive compositions are known. For example, known are stable aqueous adhesive compositions that include a vinyl acetate polymer, an ionic water-dispersed polyurethane, and an aziridine. Also known in the art are water-based vacuum-forming laminating adhesive compositions that include an ionic water-dispersed polyurethane formed by chain extending an isocyanate functional prepolymer with a polyamine and a ketimine, a carbodiimide and/or an aziridine and, optionally a vinyl acetate polymer. Such water-based adhesive compositions provide excellent adhesion of thermoplastic materials to conventional rigid substrates such as ABS and fiberboard.

More recently, there has been an attempt to replace the aforementioned ABS and fiberboard rigid substrates with substrates comprising materials which are more readily recyclable such as rigid thermoplastic polyolefinic materials which are lower in surface energy than ABS, for example polypropylene. However, conventional water-based laminating vacuum-formable adhesive compositions such as those described above often do not provide sufficient adhesion of the thermoplastic material to such polyolefin substrates.

Thus, it would be desirable to provide an aqueous-based, vacuum-formable laminating adhesive composition which provides excellent adhesion of thermoplastic materials to rigid polyolefin substrates, while maintaining heat and humidity resistance properties.

SUMMARY OF THE INVENTION

In one embodiment, the present invention is directed to an aqueous adhesive composition comprising a resinous phase dispersed in an aqueous medium, the resinous comprising (a) a polychloroprene; (b) optionally, a halogenated polyolefin different from (a); and (c) optionally, an aminoplast resin.

The present invention also is directed to an aqueous adhesive composition comprising a resinous phase dispersed in an aqueous medium, the resinous phase comprising (a) a polychloroprene; (b) a halogenated polyolefin different from (a); and (c) a polyurethane polymer comprising ionic salt groups.

In a further embodiment, the present invention is directed to a multi-layer composite comprising (1) a rigid, polyolefin substrate; (2) an adhesive layer over at least a portion of the substrate; and (3) a thermoplastic cover layer over at least a portion of the adhesive layer. The adhesive layer is formed from the aqueous adhesive composition described immediately above. The polyurethane polymer (c) is present in the aqueous adhesive composition in an amount sufficient to provide adhesion of the cover layer (3) to the substrate (1) such that the multi-layer composite passes adhesion testing as determined in accordance with Chrysler Method MS-CB132.

The present invention is further directed to a method for adhering a thermoplastic material to a rigid polyolefin substrate. The method comprises the steps of (1) applying the aqueous composition described above to at least a portion of the substrate; (2) drying the composition to form a dried adhesive layer on the substrate; (3) heating the thermoplastic material separate from the substrate; (4) contacting the thermoplastic material to the dried adhesive layer; and (5) applying a vacuum to the substrate of step (4) for a time and at a temperature sufficient to adhere the thermoplastic material to the substrate.

In addition, the present invention provides a method for adhering a thermoplastic material to a rigid polyolefin substrate comprising the steps of (1) providing a thermoplastic material having a top surface and a bottom surface; (2) applying the previously described aqueous composition to the bottom surface of the thermoplastic material; (3) drying the composition to form an adhesive layer on the bottom surface of the thermoplastic material; (4) heating the thermoplastic material of step (3) separate from the substrate; (5) contacting the adhesive layer on the bottom surface of the thermoplastic material to the rigid polyolefin substrate; and (6) applying a vacuum to the substrate of step (5) for a time and at a temperature sufficient to adhere the thermoplastic material to the substrate.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of 1" to 10" is intended to include all sub-ranges between and including the recited minimum value of 1 and the recited maximum value of 10, that is, having a minimum value equal to or greater than 1 and a maximum value of equal to or less than 10.

As previously mentioned, in one embodiment, the present invention is directed to an aqueous adhesive composition comprising a resinous phase dispersed in an aqueous medium, the resinous phase comprising (a) a polychloroprene; (b) optionally, a halogenated polyolefin which is different from and present in the composition in addition to the polychloroprene (a); and (c) optionally, an aminoplast resin. It would be recognized by those skilled in the art, that the aqueous adhesive composition can vary and be modified to meet less stringent or more stringent adhesive requirements, depending upon the end use application. For example, in some non-automotive applications, an aqueous adhesive composition comprising as major components only the polychloroprene (a) and the halogenated polyolefin which is different from (a) may be suitable. Likewise, for some applications, an aqueous adhesive composition comprising as major components only the polychloroprene (a) and the aminoplast resin (c) may be suitable. Further, there may be some applications where an adhesive composition comprising as a major component only the polychloroprene (a) may provide sufficient adhesive properties. Typically, the polychloroprene (a) is used as a component in the adhesive composition of the present invention in conjunction with one or both of (b) the halogenated polyolefin which is different from (a), and (c) the aminoplast resin.

In a particular embodiment, the present invention is directed to an aqueous adhesive composition comprising a resinous phase dispersed in an aqueous medium, the resinous phase comprising (a) a polychloroprene; (b) a halogenated polyolefin which is different from and present in the composition in addition to the polychloroprene (a); and (c) an aminoplast resin.

Although any of the known chlorinated rubbers such as polychloroprene, for example neoprene, are suitable for use as component (a), a polychloroprene is most often employed in the aqueous adhesive composition of the present invention. A particularly suitable polychloroprene is Dispercoll C VP LS 2324, a 57 percent by weight aqueous solution of neoprene, commercially available from Bayer Corporation.

The polychloroprene (a) can be present in the resinous phase of the aqueous adhesive composition of the present invention in an amount of at least 30 weight percent, sometimes at least 50 weight percent, often at least 55 weight percent, and typically at least 60 weight percent based on total weight of resin solids present in the composition. Also, the polychloroprene can be present in the aqueous adhesive composition of the present invention in an amount of less than 98 weight percent, sometimes less than 90 weight percent, often less than 80 weight percent, and typically less than 70 weight percent based on total weight of resin solids present in the composition. The amount of polychloroprene (a) present in the aqueous adhesive composition of the present invention can range between any combination of these values, inclusive of the recited values.

In addition to the previously discussed polychloroprene (a), the resinous phase of the aqueous adhesive composition of the present invention further comprises (b) a halogenated polyolefin which is different from the polychloroprene (a). The halogenated polyolefin (b) can include any of the halogenated polyolefin materials commonly known in the art. Typically, the halogenated polyolefin (b) comprises a chlorinated polyolefin, such as a chlorinated polyolefin selected from at least one of chlorinated polypropylene, chlorinated polyethylene, chlorinated ethylene-vinyl acetate copolymer, for example, ethylene-vinyl acetate-vinyl chloride copolymer, mixtures thereof and copolymers thereof. The chlorinated polyolefin can have a chlorine content of ranging from 10 to 40 weight percent, often from 10 to 30 weight percent, and typically from 15 to 25 weight percent based on the weight of polyolefin; i.e., the unchlorinated polyolefin.

The halogenated polyolefin (b) typically is in the form of an aqueous emulsion which can facilitate its incorporation into the aqueous adhesive composition of the present invention. A particularly suitable halogenated polyolefin is CP 310W, an aqueous emulsion of chlorinated polyolefin, available from Eastman Chemical Company.

The halogenated polyolefin (b), which is different from the polychloroprene (a), can be present in the resinous phase of the aqueous adhesive composition of the present invention in an amount of at least 1 weight percent, often at least 4 weight percent, and typically at least 8 weight percent based on total weight of resin solids present in the composition. Also, the halogenated polyolefin (b) can be present in the aqueous adhesive composition of the present invention in an amount of less than 25 weight percent, often less than 20 weight percent, and typically less than 16 weight percent based on total weight of resin solids present in the composition. The amount of halogenated polyolefin (b) present in the aqueous adhesive composition of the present invention can range between any combination of these values, inclusive of the recited values.

In addition to (a) the polychloroprene and the (b) halogenated polyolefin which is different from (a), the aqueous adhesive composition of the present invention further comprises (c) an aminoplast resin. Aminoplast resins, which can include phenoplasts, can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast resin contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, that in certain instances monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

The aminoplast resin (c) can be present in the resinous phase of the aqueous adhesive composition of the present invention in an amount of at least 1 weight percent, often at least 4 weight percent, and typically at least 8 weight percent based on total weight of resin solids present in the composition. Also, the aminoplast resin (c) can be present in the aqueous adhesive composition of the present invention in an amount of less than 25 weight percent, often less than 20 weight percent, and typically less than 15 weight percent based on total weight of resin solids present in the composition. The amount of aminoplast resin (c) present in the aqueous adhesive composition of the present invention can range between any combination of these values, inclusive of the recited values.

In one embodiment, the present invention is directed to an aqueous adhesive composition comprising a resinous phase dispersed in an aqueous medium, the resinous phase comprising (a) a polychloroprene such as any of the polychloroprene materials discussed in detail above; (b) a halogenated polyolefin which is different from and present in addition to the polychloroprene (a) such as any of the halogenated polyolefins discussed in detail above; and (c) a polyurethane polymer comprising ionic salt groups. The polyurethane polymer typically is dispersed in water prior to incorporation into the aqueous adhesive composition. The ionic salt groups present in the polyurethane polymer can facilitate dispersion of the polyurethane polymer into the aqueous medium. The polyurethane polymer can comprise either cationic or anionic salt groups, but typically the polyurethane polymer (c) comprises anionic salt groups. The polyurethane resin (c) can be prepared by methods well known in the art, for example, by reaction of a polyisocyanate with a polyfunctional hydroxy compound (i.e., a polyol).

The polyisocyanates for preparing the polyurethane resin of the present invention can be aliphatic or aromatic isocyanates. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane4,4',4"-triisocyanate, 1,3,5-triisocyanate benzene and 2,4,6-triisocyanate toluene; and the tetraisocyanates such as 4,4'-dimethyldiphenyl methane-2, 2',5,5'-tetraisocyanate; the polymerized polyisocyanates such as tolylene diisocyanate dimers and trimers, and the like.

The polyol useful in preparing a polyurethane resin for the present composition is typically a hydroxyl terminated polyether or polyester. The polyethers are typically poly (oxyalkylene) derivatives of polyhydric alcohols, such as glycerol, trimethylolpropane, 1,2,6-hexanetriol, sorbitol, mannitol, pentaerythritol or sucrose. Suitable polyesters are typically prepared from reaction of a carboxylic acid and a polyol, for example, reaction between adipic acid or phthalic acid and ethylene glycol, propylene glycol, 1,3-butylene glycol, 1,4-butylene glycol, diethylene glycol, 1,2,6-hexanetriol, trimethylolpropane, or trimethylolethane.

The polyurethane prepared by reacting a polyisocyanate with a polyfunctional hydroxy compound also contains ionic groups to make the polyurethane water dispersible. In the case of an anionic resin, the ionic groups can be acid salt groups which can be selected from the class consisting of $—OSO_3^-$, $—OPO_3^=$, $COO^-$, $SO_2O^-$, $POO^-$ and $PO_3^=$. The polyurethane can be prepared with reactants containing the acid salt group, or, as is more normally the case, can be prepared with free acid groups which can be subsequently neutralized. Typically, the polyurethane is prepared having isocyanate groups for reaction with materials which contain at least one active hydrogen atom reactive with isocyanate groups or at least one isocyanate group, and at least one group capable of salt formation. Most often, the acid group is in the active hydrogen material because isocyanates containing acid groups typically are not stable.

Specific examples of compounds which contain active hydrogens and acid groups capable of salt formation are hydroxy and mercapto carboxylic acid. Examples include dimethylol propionic acid, glycollic acid, thioglycollic oxalauric acid, lactic acid, malic acid, dihydroxy malic acid, tartaric acid, dihydroxy tartaric acid, and 2,6-dihydroxybenzoic acid. Other examples of compounds which contain active hydrogens and acid groups are aminocarboxylic acids, aminohydroxy carboxylic acids, sulfonic acids, hydroxy sulfonic acids and aminosulfonic acids. Examples include acid, anilido acetic acid, glycine, alpha-alanine, 6-amino caproic acid, reaction product of ethanolamine and acrylic acid, hydroxy ethyl propionic acid, 2-hydroxyethane sulfonic acid and sulphanilic acid. As mentioned above, amino acids must be used in the presence of a base such as KOH or a tertiary amine. Other examples include bis-hydroxymethylphosphinic acid, trimethylol propane monophosphate and monosulfate, N-hydroxyethyl-aminoethylphosphonic acid. Suitable salt forming agents for acid group-containing compounds include inorganic and organic bases such as sodium hydroxide, potassium hydroxide, ammonia and tertiary amines.

Suitable anionic salt group-containing polyurethane polymers are described in U.S. Pat. No. 5,430,094.

A particularly suitable anionic salt group-containing polyurethane polymer is the sulfonate salt group-containing polyurethane available as LUPHEN D207E from BASF Corporation.

Besides acid salt groups which are anionic and are preferred, the polyurethane alternatively can comprise cationic salt groups such as those which can be selected from quaternary ammonium groups, phosphonium groups, sulfonium groups, and mixed groups thereof. The polyurethane can be prepared with reactants containing the cationic salt groups, or as is more normally the case, polyurethanes containing suitable precursors can be converted to the cationic salt by adding an acid to the prepolymer. Suitable materials for introducing cationic groups into the polyurethane are materials which contain at least one active hydrogen atom reacted with isocyanate groups, or at least one isocyanate group and at least one group capable of cationic salt formation.

Other suitable cationic salt group-containing polyurethane polymers include those polyurethane polymers prepared by chain extending an isoycanate functional urethane prepolymer with polyamine and ketimine. Such polyurethane polymers are described in detail in U.S. Pat. No. 5,652,299, column 3, line 1 to column 5, line 29, incorporated herein by reference.

The polyurethane polymer comprising ionic salt groups (c) can be present in the resinous phase of the aqueous adhesive composition of the present invention in an amount of at least 0.1 weight percent, often at least 1 weight percent, and typically at least 5 weight percent based on total weight of resin solids present in the composition. Also, the polyurethane polymer (c) can be present in the aqueous adhesive composition of the present invention in an amount of less than 30 weight percent, often less than 25 weight percent, and typically less than 20 weight percent based on total weight of resin solids present in the composition. The amount of polyurethane polymer (c) present in the aqueous adhesive composition of the present invention can range between any combination of these values, inclusive of thee recited values; usually in an amount of 0.1 to 15 weight percent based on the weight of resin solids present in the composition.

Also, in conjunction with (a) the polychloroprene, (b) the halogenated polyolefin different from (a), and (c) the ionic group-containing polyurethane polymer, the aqueous adhesive composition can further comprise an aminoplast resin such as any of the previously discussed aminoplast resins.

Additionally, any of the afore-described aqueous adhesive compositions can further include adjuvant materials, for example, an aziridine compound, a carbodiimide or mixtures of these materials. As used herein, the term "aziridine" refers to any alkyleneimine and includes any compound comprising more than one of the following structural units (I):

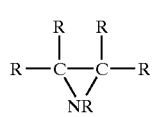

where each R independently represents H, cyclic or acyclic alkyl, alkaryl, aralkyl, or a divalent linking group such as alkylene, oxyalkylene, alkylene aryl, alkenylene, oxyalkenylene, and alkenylene aryl, provided that at least one R is a divalent linking group. As used herein, "alkylene" refers to an acyclic or cyclic, saturated hydrocarbon group having a carbon chain length of from $C_1$ to $C_{25}$, typically from $C_2$ to $C_{12}$. Nonlimiting examples of suitable alkylene groups include for example, $(CH_2)_3$, $(CH_2)_4$, $(CH_2)_5$, and $(CH_2)_{10}$. As used herein, "oxyalkylene" refers to an alkylene group containing at least one oxygen atom bonded to, and interposed between, two carbon atoms and having an alkylene carbon chain length of from $C_2$ to $C_{25}$, typically from $C_2$ to $C_{12}$. Nonlimiting examples of suitable oxyalkylene groups include those derived from allyl ethers of trimethy-lolpropane and pentaerythrito, for example, trimethylolpropane monoallyl ether, pentaerythritol monoallyl ether, polyethoxylated allyl alcohol, and polypropoxylated allyl alcohol, such as, for example, —$(CH_2)_3OCH_2C(CH_2OH)_2$ $(CH_2CH_2)$—. As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. As used herein, "alkenylene" refers to an acyclic or cyclic hydrocarbon groups having one or more double bonds and having an alkenylene carbon chain length of $C_2$ to $C_{25}$.

Such polyfunctional aziridines can include trimethylolpropane-tris-(B-(N-aziridinyl)propionate) and pentaerythritol-tris-(B-(N-aziridinyl)propionate). The aziridine compound of the present invention can be present in the composition in an amount ranging from 0.1 to 1.5 weight percent, usually from 0.2 to 1 weight percent, and typically from 0.4 to 0.8 weight percent based on total weight of resin solids present in the composition. Two polyfunctional aziridine compounds specified above are available commercially from Bayer Corporation of Pittsburgh, Pa. as XAMA-220 and XAMA-7, respectively.

As used herein, the term "carbodiimide" refers to carbodiimide and substituted carbodiimides. A carbodiimide can be present in the composition in an amount ranging from 0.25 to 5 weight percent, usually from 0.5 to 3.0 weight percent, often from 0.75 to 2.0 weight percent, and typically from 1.0 to 1.5 weight percent based on total weight of resin solids present in the composition. A suitable carbodiimide is UCARLINK XL 29SE which has a solids content of 50 percent and is commercially available from Dow Chemical Co.

Any of the afore-described aqueous adhesive compositions of the present invention optionally also can include other additives as are well known in the adhesives art, for example, plasticizers such as a butyl benzene sulfonamide, and diluents such as propylene glycol. Such compounds and other similar compounds are useful, for example, as wetting agents and flow modifiers. Other additives can include, if desired, such materials as polyvinylidene chloride, polyvinyl acetate, polyvinyl chloride, copolymers thereof, and mixtures thereof.

As discussed above, the present composition is an aqueous adhesive composition. The composition can include water in an amount ranging from 25 to 75 weight percent, often from 40 to 60 weight percent, typically from 45 to 53 weight percent based on total weight of the aqueous adhesive composition.

It should be understood that the aforementioned adhesive compositions are storage stable and suitable for use as a single-component or "one pack" composition, that is, a composition in which all the ingredients are combined substantially prior to application without the occurrence of gelation and without an unacceptable increase in viscosity over time upon storage at a given temperature. For example, an unacceptable increase in viscosity is one which requires the addition of an amount of organic solvent and/or water sufficient to decrease the composition to spray viscosity effects an unacceptable drop in composition solids.

The aqueous composition of the present invention is formulated to have an initial viscosity of about 800 to 2000 centipoise (CPS) as measured using a Brookfield viscometer with a number 3 spindle at 20 rpm and ambient temperature.

The aqueous compositions of the present invention can have a less than 100 percent gain in viscosity, usually less than a 75 percent gain in viscosity, and typically less than a 50 percent gain in viscosity after 30 days storage at ambient temperature (viscosity being measured as described above). Ambient temperature is considered to be less than 28° C. and more typically at about 25° C. It should be noted that stability of the present composition is determined at ambient temperatures and that, at accelerated times and temperatures, such viscosity characteristics may differ.

In one embodiment, the present invention is directed to a multi-layer composite comprising (1) a thermoplastic substrate, typically a rigid, polyolefin substrate; (2) an adhesive layer over at least a portion of the substrate; and (3) a thermoplastic cover layer over at least a portion of the adhesive layer. The adhesive layer can be formed from any of the previously discussed aqueous adhesive compositions, but typically is formed from the previously described aqueous adhesive composition comprising a resinous phase dispersed in an aqueous medium, where the resinous phase comprises (a) a polychloroprene; (b) a halogenated polyolefin different from (a); and (c) a polyurethane polymer comprising ionic salt groups as described in detail above. The polyurethane polymer (c) is present in the aqueous adhesive composition in an amount sufficient to provide adhesion of the cover layer (3) to the substrate (1) such that the multi-layer composite passes adhesion testing as determined in accordance with Chrysler Method MS-CB132.

The MS-CB132 method can be described as follows. First, an initial peel strength evaluation is conducted using a 1-inch strip of the multilayer composite to ascertain the initial bond strength of the adhesive. The method consists of three separate tests: (1) a heat test: wherein a multilayer composite specimen is placed into a 175° F. oven for 250 hours; (2) a humidity test wherein multilayer composite specimen is placed into a condensing humidity cabinet and is held at 100° F. and 100 percent relative humidity for a period of 250 hours; and (3) an environmental cycle test wherein a multilayer composite specimen is placed into a 175° F. oven for 24 hours, then transferred to a condensing humidity cabinet as described above in (2) for 24 hours, followed by freezing at a temperature of −29° C. for a period of 24 hours. The enviromental cycle test is repeated for two additional cycles. After each of the tests described above, bond strength of the multilayer composite is evaluated using a peel test of a 1-inch strip of the multilayer composite. An analogous peel test of the multilayer composite control which had been held at ambient conditions is also conducted 24 hours after the multilayer composite has been formed. Peel test values typically are reported in pounds of force required to remove the thermoplastic cover material from the plastic substrate to which it is bonded. For purposes of the MS-CB132 test, peel test values must be at least 8.5 pounds or foam tear must be observed after each of the above-described tests to obtain a "pass" rating.

As previously discussed, the substrate can be any thermoplastic substrate known in the art including, but not limited to, flexible film substrates such as those used in the production of laminates. Such flexible film substrates include thermoplastic films comprising polyolefins, polyesters and polyamides.

In a particular embodiment of the present invention, the substrate is a rigid substrate typically a polyolefin rigid substrate. Nonlimiting examples of suitable rigid substrates include those formed from polyethylene, polypropylene, thermoplastic polyolefin ("TPO"), reaction injected molded polyurethane ("RIM") and thermoplastic polyurethane ("TPU"), or combinations of the foregoing materials. In one embodiment of the present invention, the substrate comprises a rigid polypropylene substrate.

The substrate can be untreated or treated, for example by corona or plasma treatment techniques. In an embodiment of the present invention, the substrate is untreated.

Additionally, in a further embodiment of the present invention, the substrate can be formed from a material having a low surface energy, for example, a surface energy of less than or equal to 40 dynes per centimeter as measured by contact angle using the Owens-Wendt method in conjunction with a Rame-Hart Contact Angle Goniometer, the use of which will be familiar to those skilled in the art.

The thermoplastic cover layer can be any such material known to those skilled in the art. Such materials can include, without limitation, polyurethane, polyolefin, polyvinyl, and polyvinyl chloride materials, and combinations thereof.

In one embodiment, the present invention is directed to a method for adhering a thermoplastic material to a rigid substrate, typically a polyolefin substrate such as those described above. The method comprises the steps of (1) applying an aqueous composition to at least a portion of the substrate, the composition, as described above, comprising a resinous phase dispersed in an aqueous medium, the resinous phase comprising (a) a polychloroprene; (b) a halogenated polyolefin different from (a); and (c) a polyurethane polymer comprising ionic salt groups; (2) drying the composition to form a dried adhesive layer on the substrate; (3) heating the thermoplastic material separate from the substrate; (4) contacting the thermoplastic material to the dried adhesive layer; and (5) applying a vacuum to the substrate of step (4) for a time and at a temperature sufficient to adhere said thermoplastic material to said substrate.

Alternatively, the present invention provides a method for adhering a thermoplastic material to a rigid polyolefin substrate, such as those described above, comprising the steps of (1) providing a thermoplastic material (such as any of the thermoplastic cover materials described above) having a top surface and a bottom surface; (2) applying the previously described aqueous composition to the bottom surface of the thermoplastic material; (3) drying the composition to form an adhesive layer on the bottom surface of the thermoplastic material; (4) heating the thermoplastic material of step (3) separate from the substrate; (5) contacting the adhesive layer on the bottom surface of the thermoplastic material to the rigid polyolefin substrate; and (6) applying a vacuum to the substrate of step (5) for a time and at a temperature sufficient to adhere the thermoplastic material to the substrate.

The aforementioned methods of the present invention include applying the aqueous adhesive composition to the substrate, or alternatively, to the undersurface of the thermoplastic cover material. Application can be achieved in any manner known to those skilled in the art, and includes, for example, spraying or roll coating the adhesive onto the substrate, or alternatively, spraying or roll coating the adhesive composition onto the bottom surface of the thermoplastic cover material. The adhesive typically is applied at film thicknesses ranging from 1 to 15 mils (25 to 375 micrometers), and more typically from 5 to 10 mils (125 to 250 micrometers).

The adhesive composition then typically is dried on the substrate or, alternatively, on the bottom surface of the thermoplastic cover material. Drying can be achieved by allowing the coated substrate or thermoplastic material to air dry at room temperature or by actively drying the composition with elevated temperatures. Depending on the temperature, humidity, and film thickness, drying of the composition on the substrate can take from several minutes to one hour or more. For example, a film at a thickness of about 5 mils (125 micrometers) can be dried in a 70° C. oven in about 3 to 5 minutes.

After drying the composition or during the drying of the composition, the thermoplastic cover material is heated separate from the substrate to soften the material. Typically, the thermoplastic material is heated to a temperature ranging from 110° C. to 180° C. The heated material is then contacted to the dried adhesive composition on the surface of the substrate; or, alternatively, the dried adhesive composition on the bottom surface of the thermoplastic cover material is contacted to the surface of the substrate. Most typically, the material is contacted by draping the heated flexible cover material onto the substrate.

A vacuum is then applied to the flexible cover material over the substrate to draw the material into all recessed areas of the substrate thereby forming a conformal thermoplastic cover layer over at least a portion of the substrate. Typically, the vacuum is drawn for at least 10 seconds, but the time can vary dependent on the substrate size and shape. In the case of substrates which are not porous, holes can be made in the substrate so that a vacuum can pull the flexible material onto the substrate. In the case of porous materials, a vacuum can be achieved directly through the substrate without placing holes in the substrate.

Subsequent to application of a vacuum, the aqueous adhesive composition will cure at room temperature in about 8 to 16 hours. Cure can be accelerated by heating the laminated substrate. As used herein, the term "cure" (or "curing") is intended to include both crosslinking of the adhesive composition components and adhesive film formation as a result of evaporation of water and, if present, other diluents along with the development of physical and chemical properties in the resultant film such as bond strength.

As mentioned above, the aqueous adhesive composition can vary and be modified to meet less stringent or more stringent adhesive requirements, depending upon the end use application. For example, for non-automotive applications or applications where the Chrysler MS-CB132 peel strength test is not applicable, alternative embodiments of the adhesive compositions may meet the designated requirements.

Illustrating the invention are the following examples that are not to be considered as limiting the invention to their details. All parts and percentages in the examples, as well as throughout the specification, are by weight unless otherwise indicated.

EXAMPLES 1 THROUGH 8

The following Examples 1 through 7 describe the preparation of various aqueous adhesive compositions of the present invention. The ingredients for each of the Examples 1 through 8 were added sequentially under mild agitation to a suitably sized mixing vessel and mixed to thoroughly blend. TYCHEM 68710-00, an associative thickener of a carboxylated styrenebutadiene copolymer latex, 34 percent solids by weight, available from Reichhold Chemicals, Inc., was added to the composition of Example 7 at 0.2 percent by weight based on total weight of the formula to optimize application viscosity. All values listed in Table 1 below indicate parts by weight in grams. Comparative Example 8 is a cationic polyurethane- and polyethylene-vinyl acetate copolymer-based adhesive composition, TRIMBOND T7944, available from PPG Industries, Inc. of Pittsburgh, Pa, which contains no polychloroprene, no halogenated polyolefin, and no aminoplast resin.

TABLE 1

| Ingredient | Example 1 | Example 2 | Example 3 | Example 4 | Example 5 | Example 6 | Example 7 | Example 8 |
| --- | --- | --- | --- | --- | --- | --- | --- | --- |
| DISPERCOL L C-74[1] | 99.83 | 97.03 | 82.19 | 78.06 | 74.43 | 59.63 | 52.28 | — |
| DISPERCOL L LS2324[2] | — | — | — | — | — | — | — | 56.36 |
| CP 310W[3] | — | — | 17.66 | 16.77 | — | 20.34 | 25.27 | 26.77 |
| CYMEL 303[4] | — | 2.81 | — | 5.03 | 4.32 | — | 3.79 | 6.02 |
| LUPHEN D207E[5] | — | — | — | — | 19.19 | 18.08 | 16.85 | 8.92 |
| XAMA 220[6] | — | — | — | — | 0.22 | 0.20 | 0.19 | 0.20 |
| UCARLINK XL29SE[7] | — | — | — | — | 1.73 | 1.63 | 1.52 | 1.61 |
| AKROSPER SE E98[8] | 0.17 | 0.16 | 0.15 | 0.14 | 0.12 | 0.12 | 0.11 | 0.11 |

[1]Aqueous emulsion of Neoprene, 57% solids by weight, available from Bayer Corp.
[2]Aqueous emulsion of Neoprene, 57% solids by weight, available from Bayer Corp.
[3]Chlorinated polyolefin aqueous emulsion, 30% solids by weight, available from Eastman Chemical Co.
[4]Alkylated melamine resin, 100% solids by weight, available from Cytec Industries, Inc.
[5]Anionic polyurethane aqueous emulsion, 45% solids by weight, available from BASF Corp.
[6]Polyfunctional aziridine, 100% solids by weight, available from Bayer Corp.
[7]Carbodiimide solution, 50% solids by weight, available from Dow Chemical Co.
[8]Blue dye, 35% solids by weight, available from Akrochem Inc.

Each of the adhesive compositions of Examples 1 through 8 and Comparative Example 8 were applied to polypropylene test plaques (4"×4") available from Collins & Aikman using a 6 mils (150 microns) draw bar. The adhesive films thus applied were dried at ambient temperature for 10 to 15 minutes, followed by dehydration at 70° C. for 7 minutes, to yield a dry film thickness of about 3 mils (75 microns). At that time a foam-backed thermoplastic cover material comprising a polyvinyl chloride cover layer backed with polyethylene foam (available from O'Sullivan Company) was contacted to the adhesive layer formed on the polypropylene substrates and the composite was placed in a hot press and heated to a bond line temperature of 54° C. to 60° C. (130° F. to 140° F.) at which time a pressure of 21.9 pounds per square inch was applied for about 11 seconds. The multi-layer composite test plaques thus formed were permitted to cure at ambient temperature for one hour prior to initial peel strength testing; and 24 hours for subsequent peel strength testing. The test plaques that gave passing peel strength after 24 hours were submitted to humidity and heat resistance testing as described above. The system with the best overall test results, that is the composition of Example 8, was further evaluated as follows.

An automotive bolster door part made from Exxon's polypropylene available from Cascade Engineering was formed. The adhesive composition of Example 7 was spray applied to the substrate surface. The adhesive film thus applied was dried at ambient temperature for 10 to 15 minutes, followed by dehydration at 70° C. for 7 minutes, to yield a dry film thickness of about 3 mills (75 microns). The foam-side of the polyvinyl cover material (described above) was heated to a temperature of 171° C. to 182° C. (340° F. to 360° F.) at which time the foam side of the cover material was contacted to the adhesive layer on the substrate. A vacuum was then applied at 15–20 inches Hg for a period of 40 seconds. The resulting multilayer composite was conditioned to room temperature (about 1 hours) at which time initial peel strength was determined as described above. After 24 hours at room temperature, the mulitlayer composite bolster door part was then subjected to humidity and heat resistance testing as described above. Test results are reported in the following Table 2.

It should be understood that when using a thermoplastic cover material which is not foam-backed, the bond strength of the adhesive layer between the cover material and the substrate is reported only in pounds of force required to pull the cover material from the substrate. However, when evaluating a foam-backed cover material, since the force required to pull the cover material from the substrate may be more of a function of the cohesive strength of the foam than the bond strength of the adhesive, any instance where, in all areas of the one-inch strip, some thickness of foam is remaining on the substrate and some thickness of foam is remaining on the cover material after the peel test is considered to pass the peel strength test. This condition is referred to as "foam tear".

For purposes of the present invention, however, the thermoplastic cover material included a foam backing material. This affected the force needed to pull the cover material from the substrate, because the foam itself has poor cohesive strength. Hence, a passing adhesive composition would require that the foam layer split upon application of force, thereby leaving a layer of foam adhered to the substrate. This is described as "foam tear" in the data table above.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, We claim:

1. An aqueous adhesive composition comprising a resinous phase dispersed in an aqueous medium, said resinous phase comprising
    (a) 30 to 98 percent by weight of a polychloroprene;
    (b) 1 to 25 percent by weight of a halogenated polyol fin different from (a); and
    (c) 0.1 to 15 percent by weight of a polyurethane polymer comprising ionic salt groups, wherein weight percentages are based on total weight of resin solids present in the composition.

2. The adhesive composition of claim 1, wherein the halogenated polyolefin (b) comprises a material selected from at least one of chlorinated polypropylene, chlorinated polyethylene, chlorinated ethylene-vinyl acetate copolymer, mixtures thereof, and copolymers thereof.

3. The adhesive composition of claim 1, wherein the polyurethane polymer (c) comprises anionic salt groups.

4. The adhesive composition of claim 1, wherein the polyurethane polymer (c) comprises cationic salt groups.

5. The adhesive composition of claim 1 further comprising an aminoplast resin.

6. The adhesive composition of claim 1 further comprising an adjuvant material selected from a carbodiimide, an aziridine, and mixtures thereof.

TABLE 2

Unless indicated otherwise, all values reported are in pounds of force required to peel away a one-inch strip of the cover material from the substrate, and/or cause foam tear as described above.

| Peel Test condition (Plaques) | Example 1 | Example 2 | Example 3 | Example 4 | Example 5 | Example 6 | Example 7 | Example 8 | Example 9* |
|---|---|---|---|---|---|---|---|---|---|
| Initial | 4.2 | 7.2 | 8.3 | 9.9 FT | 10.4 PFT | 11.1 | 9.2 | 9.3 FT | 2.0 |
| 24 hours | 1.0 | 11.8 PFT | 9.8 | 11.4 FT | 7 | 10.4 | 17.5 FT | 10.7 FT | 1.0 |
| Humidity | delam. 1 day | delam. 1 day | delam. 5 hours | delam. 1 day | delam. 1 day | 7.6/4.2 | 13.0 FT, 10.4 FT/ 12.8 FT, 8.8 | 11.1 FT, 11.9 FT/ 10.1 FT, 10.9 FT | 0.9/1.6 |
| Peel Test condition (door part) | | | | | | | | | |
| Humidity | — | — | — | — | — | — | — | FT all areas | — |
| Heat | — | — | — | — | — | — | — | FT all areas | — |

*Comparative Example
By "delam." is meant full delamination of the cover material from the substrate.
By "FT" is meant foam tear; by "PFT" is meant partial foam tear.
Humidity resistance peel test values are indicated as "before humiditiy testing/after humidity testing".

7. A multi-layer composite comprising:
(1) a rigid, polyolefin substrate;
(2) an adhesive layer over at least a portion of the substrate; and
(3) a thermoplastic cover layer over at least a portion of the adhesive layer,
wherein the adhesive layer is formed from an aqueous adhesive composition comprising a resinous phase dispersed in an aqueous medium, said resinous phase comprising:
   (a) 30 to 98 percent by weight of a polychloroprene;
   (b) 1 to 25 percent by weight of a halogenated polyolefin different from (a); and
   (c) 0.1 to 15 weight percent of a polyurethane e polymer comprising ionic salt groups, wherein weight percentage are based on total weight of resin solids present in the composition, an wherein the polyurethane polymer (c) is present in an amount sufficient to provide adhesion of the cover layer (3) to the substrate (1) such that the multi-layer composite passes adhesion testing as determined in accordance with Chrysler Method MS-CB132.

8. The multi-layer composite of claim 7, wherein the substrate (1) is an untreated substrate.

9. The multi-layer composite of claim 7, wherein the substrate (1) comprises polypropylene.

10. The multi-layer composite of claim 7, wherein the substrate (1) has a surface energy of less than or equal to 40 dynes per centimeter.

11. The multi-layer composite of claim 7, wherein the cover layer (3) comprises a material selected from polyurethane, polyolefin, polyvinyl, and mixtures thereof.

12. The multi-layer composite of claim 7, wherein the polyurethane polymer (c) comprises cationic salt groups.

13. The multi-layer composite of claim 7, wherein the polyurethane polymer (c) comprises cationic salt groups.

14. The multi-layer composite of claim 7, wherein the adhesive composition further comprises an aminoplast resin.

15. The multi-layer composite of claim 7, wherein the adhesive composition further comprises an adjuvant material selected from a carbodiimide, an aziridine, and mixtures thereof.

16. A method for adhering a thermoplastic material to a rigid polyolefin substrate comprising:
(1) applying an aqueous composition to at least a portion of the substrate, the composition comprising a resinous phase dispersed in an aqueous medium, said resinous phase comprising:
   (a) 30 to 98 percent by weight of a polychloroprene;
   (b) 1 to 25 percent by weight of a halogenated polyolefin different from (a); and
   (c) 0.1 to 15 percent by weight of a polyurethane polymer comprising ionic salt groups, wherein weight percentages are based on total weight of resin solids present in the composition;
(2) drying said composition to form a dried adhesive layer on the substrate;
(3) heating said thermoplastic material separate from the substrate;
(4) contacting said thermoplastic material to said dried adhesive layer; and
(5) applying a vacuum to the substrate of step (4) for time and at a temperature sufficient to adhere said thermoplastic material to said substrate.

17. The method of claim 16, wherein the substrate comprises polypropylene.

18. The method of claim 16, wherein the thermoplastic material is heated to a temperature ranging from 110° C. to 180° C.

19. The method of claim 16, wherein the thermoplastic material comprises a material selected from polyurethane, polyolefin, polyvinyl, and mixtures thereof.

20. The method of claim 16, wherein the polyurethane polymer (c) comprises anionic salt groups.

21. The method of claim 16, wherein the polyurethane polymer (c) comprises cationic salt groups.

22. The method of claim 16, wherein the aqueous composition further comprises an aminoplast resin.

23. The method of claim 16, wherein the aqueous composition further comprises an adjuvant material selected from a carbodiimide, an aziridine, and mixtures thereof.

24. A method for adhering a thermoplastic material to a rigid polyolefin substrate comprising:
(1) providing a thermoplastic material having a top surface and a bottom surface;
(2) applying an aqueous composition to the bottom surface of the thermoplastic material, the composition comprising a resinous phase dispersed in an aqueous medium, said resinous phase comprising:
   (a) 30 to 98 percent by weight of a polychloroprene;
   (b) 1 to 25 percent by weight of a halogenated polyolefin different from (a); and
   (c) 0.1 to 15 percent by weight of a polyurethane polymer comprising ionic salt groups, wherein weight percentages are based on total weight of resin solids present in the composition;
(3) drying said composition to form an adhesive layer on the bottom surface of said thermoplastic material;
(4) heating said thermoplastic material of step (3) separate from the substrate;
(5) contacting said adhesive layer on the bottom surface of the thermoplastic material to the rigid polyolefin substrate; and
(6) applying a vacuum to the substrate of step (4) for a time and at a temperature sufficient to adhere said thermoplastic material to said substrate.

* * * * *